UNITED STATES PATENT OFFICE.

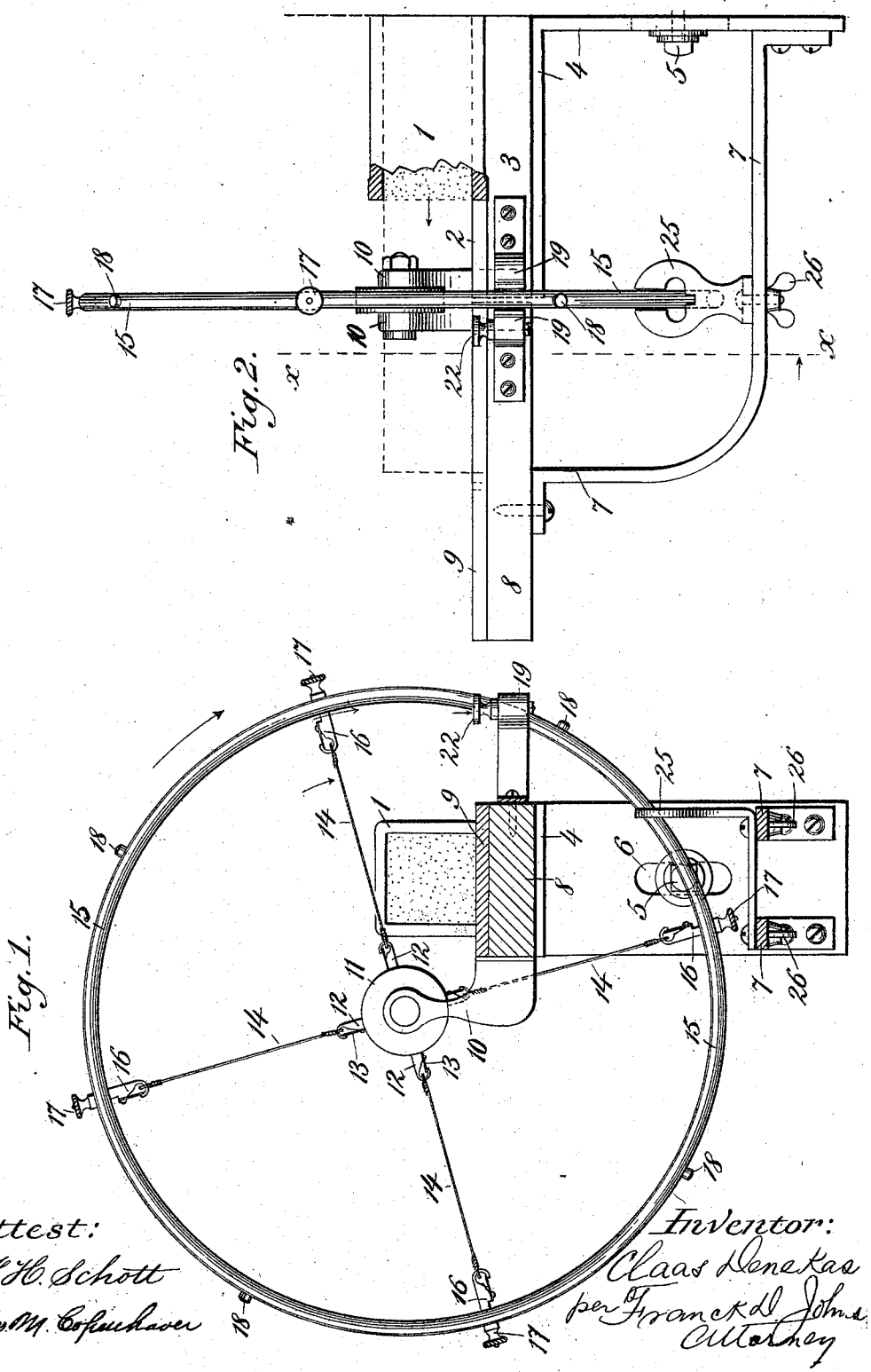

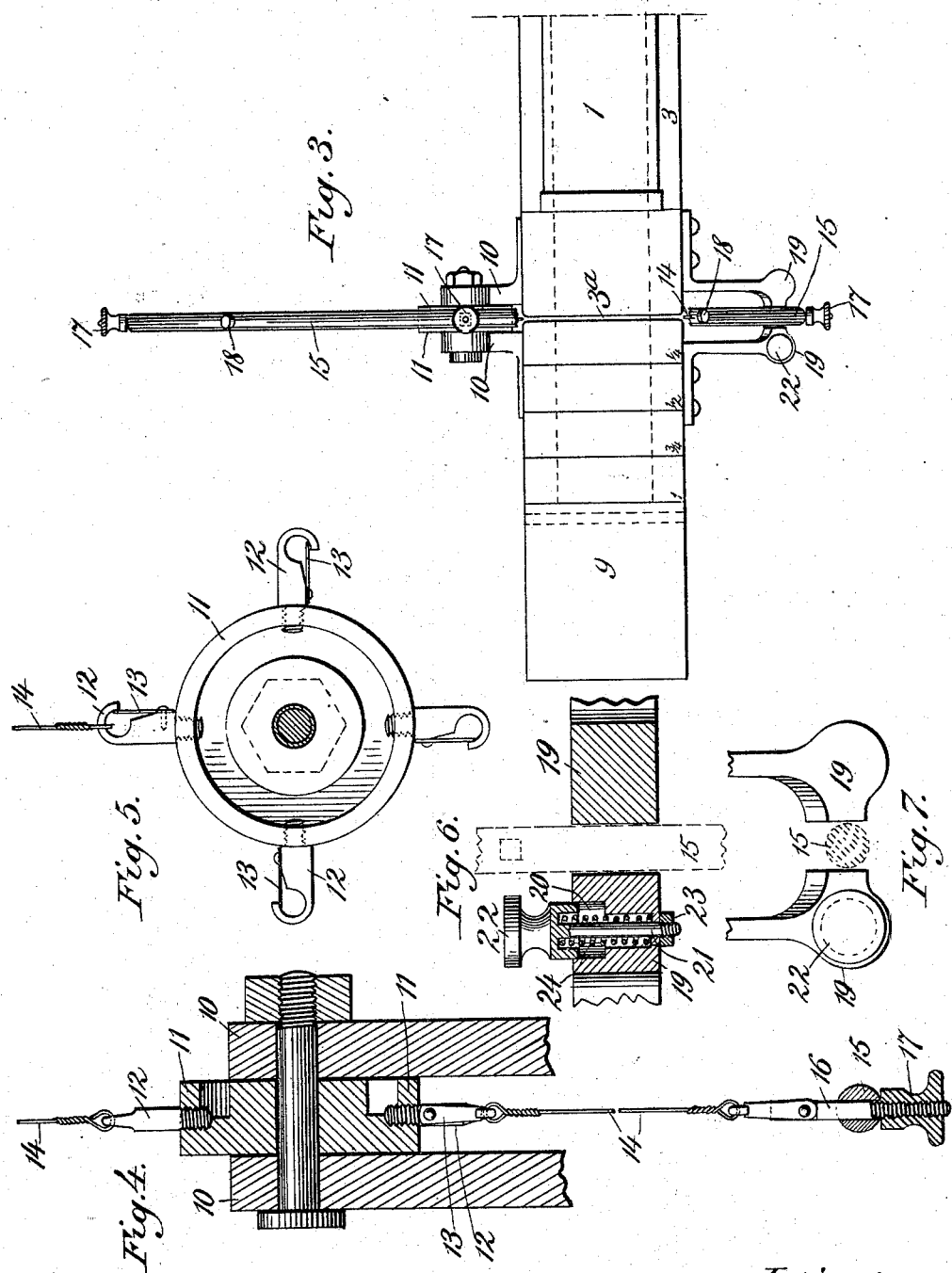

CLAAS DENEKAS, OF WASHINGTON, DISTRICT OF COLUMBIA.

MACHINE FOR CUTTING YEAST-CAKES.

SPECIFICATION forming part of Letters Patent No. 571,345, dated November 17, 1896.

Application filed August 17, 1896. Serial No. 602,991. (No model.)

*To all whom it may concern:*

Be it known that I, CLAAS DENEKAS, a citizen of the United States, residing at Washington, in the District of Columbia, have invented certain new and useful Improvements in Machines for Cutting Yeast-Cakes; and I do hereby declare the following to be a full, clear, and exact description of the invention, such as will enable others skilled in the art to which it appertains to make and use the same.

My invention relates to devices for accurately cutting compressed yeast into cakes of predetermined size and weight, and has for its object to provide an improved construction or device for accomplishing this object that will not only clearly and accurately perform the cutting operation, but will also dispense with any unnecessary movements of the cutter. In devices of this character heretofore in use a reciprocating cutting-wire has been employed, and the yeast has been expressed in compressed form through a feed-nozzle onto a table past the line of reciprocation of said cutting-wire, and said wire has been brought down through the yeast to perform the cutting operation, and then had to be raised to its initial position. Now as the yeast is fed continuously it will readily be seen that the wire would have to be operated by an expert to prevent its return movement from cutting the corner of the next cake to be cut. It is to do away with this disadvantage that my invention is primarily intended, and this I accomplish by providing a cutting-wheel having a series of cutters arranged therein and serving also as the spokes therefor, and which will cut the cakes *seriatim* by the step-by-step rotation of said wheel, thus dispensing entirely with the necessity for the return movement of the cutter past the end of the yeast-cake.

Certain other novel elements are also embodied in my improved construction, as will be hereinafter definitely pointed out and claimed, reference being had to the accompanying drawings, in which—

Figure 1 is a transverse sectional view of my improved device taken on the line $xx$, Fig. 2. Fig. 2 is a side elevation of the same. Fig. 3 is a top plan view of the same, a portion of the rim and cutters being broken away. Fig. 4 is an enlarged central vertical sectional view of the cutting-wheel. Fig. 5 is a detail side elevation of the hub of the cutting-wheel. Fig. 6 is a detail sectional view of the cutter-wheel guides and finger-stop, and Fig. 7 a top plan view of the same.

Like numerals of reference denote corresponding parts in the several views.

In the said drawings the reference-numeral 1 denotes the delivery-end of a feeding-nozzle for the compressed yeast, said yeast being properly forced therethrough in the direction of the arrow, Fig. 2, in a continuous form by any suitable means. (Not shown.) As shown in Fig. 1, this nozzle is rectangular in cross-section and is made to conform with the size and shape of an ordinary yeast-cake. The bottom of this nozzle registers accurately with the top surface 2 of the table 3, so that no impediment will be offered to the continuous movement of the yeast along said table. Said table is adjustably supported by a bracket 4, attached to the side of the device from whence the yeast is expressed by means of an adjusting-screw 5 passing through a slot 6 in said bracket, as shown, thus providing for an accurate vertical adjustment of the table 3. Additional brackets 7, carried by the bracket 4, serve to support an extension 8 of the table 3, having an upper surface 9, registering with the upper surface 2 of said table 3. These tables have their adjacent ends a slight distance apart, forming a slot $3^a$, as shown in Fig. 3, and for a purpose hereinafter to be described.

Mounted in suitable bearings 10, one carried by each of the tables 3 and 8, is a hub 11, said hub having screwed or otherwise fastened therein a series of hooks 12, preferably four in number, and each provided with a spring-closure 13, as shown. Engaged by these hooks are a corresponding number of cutters 14, formed preferably of thin wire and extending therefrom radially to the rim 15, where they are engaged in a similar manner by spring-hooks 16, passing loosely through rim 15 and screw-threaded on their outer ends for the reception of thumb-nuts 17, whereby the tension of said cutters may be accurately adjusted. Mounted on the periphery of said rim 15 and centrally between the hooks 16 are a series of guide-pins 18, for a purpose hereinafter to be described. From the above description it will be understood that the cutters 14 also serve as spokes to retain the rim 15 in its proper relation to the hub 11.

Projecting to one side of the tables 3 and 8 and attached one to each are two guides 19, serving to steady the rim 15 in its rotation. One of said guides is recessed at 20 to receive the stem 21 of a stop 22 passing therethrough and provided with a nut 23 on its lower end. A coiled spring 24 in said recess serves to normally retain said stop 22 in its uppermost position.

An additional guide 25 for the rim 15 may also be provided and mounted on the bracket 7 by the thumb-screw 26.

From the above description the operation of the device will be understood to be as follows: The hub 11 being mounted as shown will be in such relative position to the slot 3$^a$, between the adjacent ends of the tables 3 and 8, that the cutters 14 will pass through said slot in their rotation. Now by turning the cutting-wheel to the position shown in Fig. 1, so that one of the cutters 14 is just above the line of passage of the compressed yeast as it emerges from the nozzle 1, the operator can, by grasping with the right hand the rim 15 of said wheel at the guide-pin 18 just above said cutter at the proper moment, rotate said wheel and cut a yeast-cake. As said wheel rotates, however, the thumb of the operator will come in contact with the spring-yielding stop 22, by which time the cutter will have passed completely through the yeast and completed its cutting operation. The severed cake may be removed from the table by the other hand of the operator, while the latter takes a fresh hold on the rim 15 at the next guide-pin 18, preparatory to another cut. It will thus be seen that this operation may be continued indefinitely, each cut bringing the next cutter into proper position for its cut without the necessity for a return movement of the cutters.

While I have preferably shown guide-pins 18 projecting from the periphery of rim these pins may be dispensed with and suitable gage-marks formed on the rim at the same points that the guide-pins are now located, which gage-marks would be the equivalent of said guide-pins and indicate the point at which the rim is to be grasped by the operator.

I have shown in Fig. 3 a series of transverse gage-lines on the upper surface 9 of the table 8 marked, respectively, "$\frac{1}{4}$," "$\frac{1}{2}$," "$\frac{3}{4}$," and "1," which are intended to denote how far the yeast must be fed along the table in order that the cut will sever one-quarter pound, one-half pound, three-quarters pound, or one pound, respectively. The dotted lines to the left of the one-pound gage-line are to provide for cutting a little more than one pound where the yeast is not to be sold immediately, in order to compensate for the loss of weight due to evaporation.

Having thus described my invention, what I claim as new, and desire to secure by Letters Patent, is—

1. In an apparatus for cutting yeast-cakes from a continuous feed of compressed yeast, the combination with a table, and means for continuously feeding the yeast along the same, of a cutting-wheel mounted transversely to said table and consisting of a hub, a series of cutters, and a rim, the said cutters also forming the spokes for connecting said hub and rim and passing in their rotation through a transverse slot in said table, and a stop in proximity to the rim for indicating the completion of each successive cut, substantially as set forth.

2. In an apparatus for cutting yeast-cakes from a continuous feed of compressed yeast, the combination with a table, and means for continuously feeding the yeast along the same, of a cutting-wheel mounted transversely to said table and consisting of a hub, a series of cutters, and a rim, the said cutters also forming the spokes for connecting said hub and rim and passing in their rotation through a transverse slot in said table, guide-pins on said rim for the hand of the operator, and a stop in proximity to the rim for indicating the completion of each successive cut, substantially as set forth.

3. In an apparatus for cutting yeast-cakes from a continuous feed of compressed yeast, the combination with a feeding-nozzle through which the compressed yeast is expressed by suitable means, of a table for receiving the expressed yeast from said nozzle and composed of two sections having their adjoining ends a slight distance apart to form a transverse slot, means for adjustably supporting said table-sections in position with respect to said nozzle, a series of transverse gage-lines on the table-section farthest from the nozzle to indicate the amount of compressed yeast that has passed the transverse slot, and a cutting-wheel having its cutters rotating through said slot to cut the yeast, substantially as set forth.

4. In an apparatus for cutting yeast-cakes from a continuous feed of compressed yeast, the combination with a table, and means for continuously feeding the yeast along the same, of a manually-operated cutting-wheel mounted transversely to said table and having its cutters passing in their rotation through a transverse slot in said table, guide-pins on said wheel for indicating the successive points to be grasped by the operator, and a vertically-yielding stop in proximity to said wheel against which the hand of the operator will contact when each successive cut is completed, said stop having a stem passing through its support and an interposed spring to retain said stop in its normal uppermost position, substantially as set forth.

5. In an apparatus for cutting yeast-cakes from a continuous feed of compressed yeast, the combination with a table, and means for continuously feeding the yeast along the same, of a manually-operated cutting-wheel mounted transversely to said table and having its cutters passing in their rotation through a transverse slot in said table, a guide for said wheel mounted upon the side of the table, and a vertically-yielding stop mounted in said guide and against which the hand of the operator contacts at the completion of each successive cut of the cutting-wheel, substantially as set forth.

In testimony whereof I affix my signature in presence of two witnesses.

CLAAS DENEKAS.

Witnesses:
PHILIP F. LARNER,
PERCY B. HILLS.